March 14, 1967 — E. G. MARKOW — 3,308,595
STRUCTURAL UNIT WITH ENGAGING MEANS
Filed July 23, 1964
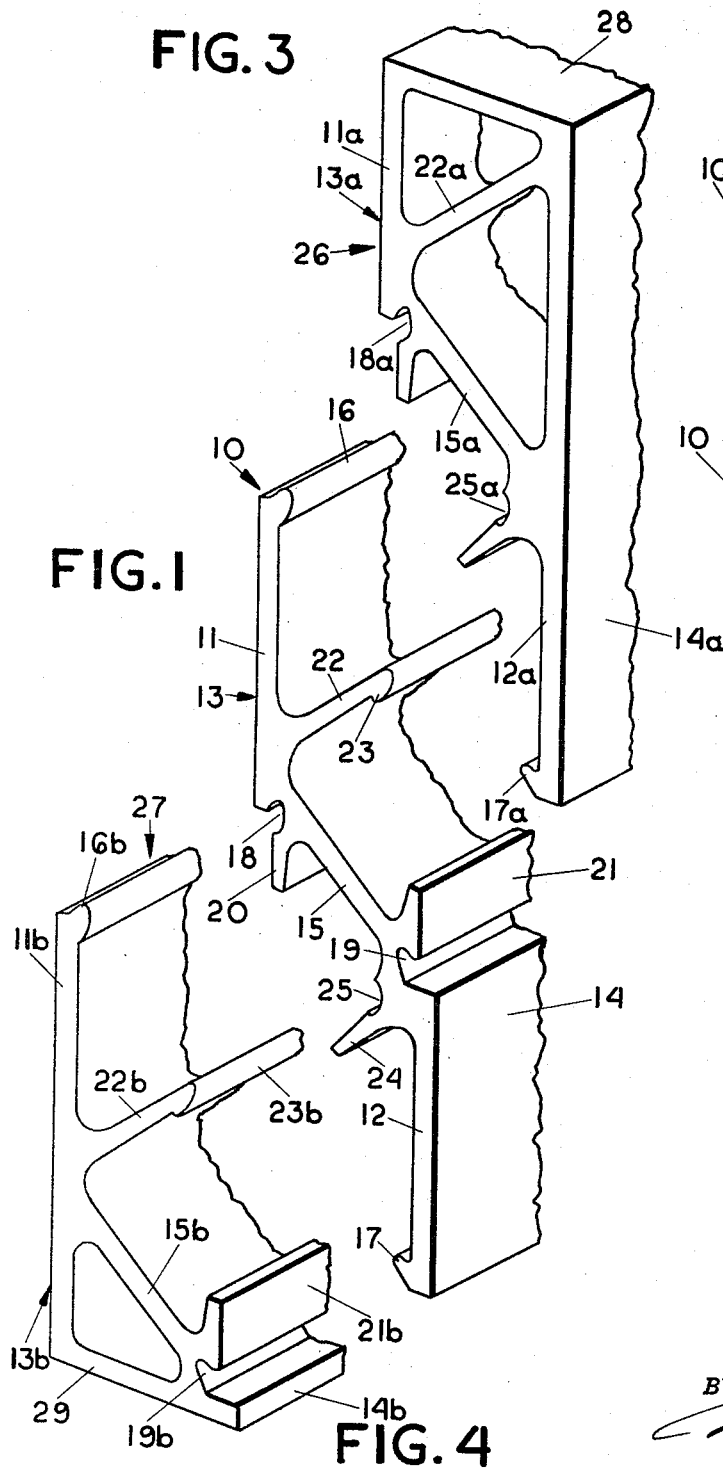
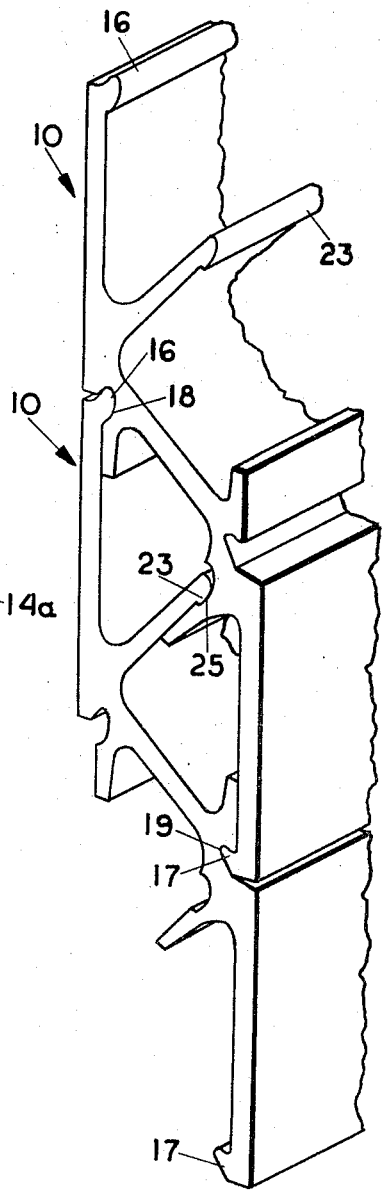
*INVENTOR.*
EDWARD G. MARKOW
BY
ATTORNEY

United States Patent Office 3,308,595
Patented Mar. 14, 1967

3,308,595
STRUCTURAL UNIT WITH ENGAGING MEANS
Edward G. Markow, Oakdale, N.Y., assignor to Grumman Aircraft Engineering Corporation, Bethpage, N.Y., a corporation of New York
Filed July 23, 1964, Ser. No. 384,708
3 Claims. (Cl. 52—579)

This invention relates generally to structural panels such as are employed in walls, floors, and the like and, more particularly, to a preformed structural unit adapted to be securely fitted together with one or more similarly formed units to produce such a structural panel.

Among other things, the present invention contemplates a structural unit which when assembled with similar units produces a composite panel construction having maximum strength-to-weight ratio. Moreover, the design of this structural unit is such that it lends itself to mass production of multiple, substantially identical units adapted to be readily interconnected one with another in unyielding assembly to produce the ultimate panel. The ultimate panel assembly thus produced may be formed with smooth or continuous and unbroken outer surfaces which may be finished in accordance with conventional techniques.

In addition, each structural unit as herein proposed is formed in such a way that when interconnected with associated units a positive clamping pressure therebetween results to secure and maintain the assembled panel. At the same time, when desired, this clamping pressure may be released and the several units disassembled, stored, shipped, etc. and subsequently reassembled. On the other hand, when a permanent panel assembly is desired, this clamping pressure or pre-load insures constant contact between abutting and/or mating surfaces of such units whereby conventional adhesive bonding techniques may be employed without the use of additional pressure-applying apparatus.

To the above ends the instant invention has in view an integrally-formed structural unit which in its broadest aspects comprises a pair of spaced exterior surfaces disposed in different planes and interconnected by at least one integral web disposed therebetween in a plane angular to the planes of the surfaces. This unit includes a plurality of individual engagements between its exterior surfaces that are designed and adapted to receive and interlock with complementary engagements of another similarly-formed structural unit.

More specifically, the exterior surfaces of the structural unit are established by spaced walls that are substantially contiguously disposed with the interconnecting web between adjacent portions of these walls. The exterior surface or surfaces of such walls establish the plane of the exposed surface or surfaces of the ultimate panel assembly and may be preformed or shaped, treated, finished, etc. as desired. On the other hand, the adjacent surfaces of such walls are formed or otherwise provided with the mating engagements pre-loaded in opposition one to the other to coact with and secure their counterparts formed on the associated unit under predetermined clamping pressure.

Thus, when two such units are brought together with their corresponding engagements aligned and sufficient force applied to overcome the pre-loading therein the units are secured or snapped together in unyielding connection. At this time the outer surfaces of the walls of each unit are disposed contiguous to and in the desired plane with respect to the outer surfaces of the associated unit walls.

With the above and other objects in view, as will be apparent, this invention consists in the construction, combination and arrangement of parts, all as hereinafter more fully described, claimed and illustrated in the accompanying drawings illustrating a preferred embodiment of the invention wherein:

FIG. 1 is an end view in perspective of a fragmentary length of a structural unit constructed in accordance with the teachings of the present invention to show the integral connection of the spaced walls and the engagement means carried thereby for coaction with corresponding means of a similar unit;

FIG. 2 is a similar view of two such units when assembled to show their mating coaction whereby they are interlocked one with the other to produce a rigid construction;

FIG. 3 is a similar view of the structural unit shown in FIG. 1 slightly modified to form a terminal element for one end of the ultimate panel assembly produced by the interconnection of multiple structural units in accordance with FIG. 2; and FIG. 4 is a similar view of the structural unit shown in FIG. 1 slightly modified to form a terminal element for the other end of the ultimate panel assembly produced by the interconnection of multiple structural units in accordance with FIG. 2.

Referring more particularly to the drawings, 10 designates a structural unit as herein proposed. The unit 10 is formed by a pair of spaced substantially contiguously disposed walls 11 and 12 having remote or exterior surfaces 13 and 14 respectively that establish the exposed surface or surfaces of the ultimate panel assembly in a desired, predetermined plane. The walls 11 and 12 are interconnected adjacent their associated sides by an intermediate, integral web 15 formed on and projecting from the inner or facing surfaces of the walls 11 and 12. The web 15 extends from each wall 11 and 12 so as to be disposed in a plane angular to the plane of each such wall.

At and along the marginal edge of their remote sides each wall 11 and 12 terminates in a laterally turned projection in the form of a hooked flange 16 or 17 respectively. The flanges 16 and 17 each project inwardly of their respective walls 11 and 12, i.e. towards one another and point in the same direction (upward in FIG. 1). At and along the marginal edge of their adjacent sides at the junction of the web 15 therewith each wall 11 and 12 is formed or otherwise provided with a groove 18 and 19 respectively. The walls defining the grooves 18 and 19 are contoured corresponding to the respective flanges 16 and 17 in the form of mating counterparts.

Defining the opposite edge of each groove 18 and 19 and projecting in a direction from the associated wall 11 and 12 is an abutment 20 or 21 respectively which is integral with and extends from the web 15. The outer surface of each abutment 20 and 21 is disposed substantially in the plane of the inner surface of the associated wall 11 or 12.

Integrally formed on and projecting inwardly and laterally from the wall 11 at or near the junction of the web 15 therewith is a rib 22 which terminates substantially in the plane of the inner surface of the wall 12. Preferably the rib 22 and the web 15 are symmetrically disposed about a plane normal to the wall 11. At and along its outer edge the rib 22 is formed with an integral bead 23 projecting laterally therefrom towards the web 15.

A foreshortened rib 24 is similarly formed on the wall 12 to project inwardly and laterally from the wall 12 at or near the junction of the web 15 therewith. This rib 24 is disposed substantially parallel to the rib 22 and is formed or otherwise provided with a groove 25 matingly complemental to the bead 23.

From the foregoing it is apparent that when two of the structural units 10 as above described are disposed in side by side alignment the several projections, i.e. flanges 16 and 17 and bead 23 of one unit 10 constituting male components can be inserted in the respective grooves 18, 19 and 25 of the other unit 10 constituting female components. This is shown in FIG. 2. Thus, any number of such structural units 10 may be interconnected to form an ultimate panel assembly of desired dimensions and having an exterior or exposed surface or surfaces of predetermined configuration as established by the plane or planes of the several surfaces 13 and 14.

In order to maintain the ultimate panel assembly secure with the several units 10 in unyielding, interlocked connection the various projecting members viz. walls 11 and 12, abutments 20 and 21, ribs 22 and 24 are all preformed at a selected angle to place them under load acting in opposition to the corresponding members of the associated unit 10 when forcibly interconnected therewith. This is essentially accomplished by establishing a predetermined transverse distance between the walls 11 and 12 at their remote portions that is less than at their adjacent portions where they connect with the web 15.

The direction of the force applied by this preloading is the same as that imposed by external loading on the ultimate panel assembly in service so that the possibility of disconnection of the units 10 thereby is eliminated. Such external loading thus serves to supplement the preloading or inherent loading of the panel assembly thereby enhancing its structural rigidity and integrity.

At the same time a relatively small force applied in opposition to that of the inherent and service-imposed loading will cause the separation of the several units 10 one from another. In this way the panel assembly may be readily knocked down or disassembled for shipment, transport, storage, etc. and subsequently reassembled.

On the other hand where a permanent panel assembly is desired or required the inherent loading serves to maintain the entire area of each of the engaging or abutting surfaces of the associated units 10 in intimate contact while being bonded or the like. Thus, an appropriate adhesive may be applied to such engaging or abutting surfaces prior to assembly of the units 10 and the intimate immovable position thereof is assured until the adhesive is fully cured or set. This eliminates the need for special fixtures and apparatus customarily employed for this purpose and avoids all the problems accompanying such apparatus and its use.

Referring now to FIGS. 3 and 4, 26 and 27 designate terminal elements for each end of the panel assembly constructed of multiple structural units 10 as hereinabove described. Each of these elements 26 and 27 is structurally similar to the basic unit 10, being only slightly modified to include an additional integral wall disposed substantially normal to the spaced walls defining opposite surfaces of the ultimate panel assembly.

More specifically, in terminal element 26 the side of wall 12a does not terminate in a plane substantially contiguous with the adjacent side of wall 11a but is coextensive therewith. Thus, corresponding sides of the walls 11a and 12a terminate in a common plane and are interconnected by an integral wall 28 substantially perpendicular thereto. The rib 22a is integrally formed with and projects from the inner surface of the wall 12a, the abutment 21, groove 19 and bead 23 of the unit 10 being eliminated in element 26.

When the final unit 10 of the panel assembly is connected with the terminal element 26, the flange 16 and bead 23 of unit 10 are each clampingly and matingly engaged in grooves 18a and 25a respectively of the element 26. At the same time, the flange 17a of element 26 is similarly engaged in the groove 19 of the unit 10. When thus assembled the exterior surfaces 13a and 14a of the terminal element 26 are coplanar with the corresponding surfaces 13 and 14 to form a smooth and substantially uninterrupted continuation thereof. Hence the assembly of element 26 with the associated unit 10 is for all intents and purposes the same as the assembly of two units 10 as previously described.

The terminal element 27 also differs from the structural unit 10 in that it includes an integral end wall 29 substantially perpendicular to the wall 11b. To this end the side of wall 11b remote from the flange 16b terminates in a lateral projection that constitutes the end wall 29. The opposite sides of the web 15b are integrally connected to and project laterally from the inner surfaces of the walls 11b and 29 respectively, the abutment 20, grooves 18 and 25, and the rib 24 of the unit 10 being eliminated in element 27. The marginal edge portion of the wall 29 defines a portion of the groove 19b and terminates in a plane outwardly of the face of the adjacent abutment 21b a distance substantially equal to the thickness of the wall 12 of unit 10. The edge surface of the wall 29 constitutes the exterior surface 14b to coact with the surface 14 of the unit 10 in establishing the plane of the exposed surface of the ultimate panel assembly in opposition to the surface 13b.

When the final unit 10 of the panel assembly is connected with the terminal element 27, the flange 16b and bead 23b carried by its rib 22b of element 27 each clampingly and matingly engage the grooves 18 and 25 respectively of the unit 10. Also the flange 17 of the unit 10 similarly engages the groove 19b of the element 27. Hence, the assembly of element 27 with the associated unit 10 is for all intents and purposes the same as the assembly of the terminal element 26 with an associated unit 10 or the assembly of two units 10 to one another.

From the foregoing it is apparent that the ultimate panel assembly produced by interlocking multiple structural units 10 one to another with or without the terminal elements 26 and 27 has high strength-to-weight characteristics. In this respect it has all the attributes of sandwich structures, such as the corrugated filler type, without the attendant disadvantages thereof, notably in its fabrication. Moreover, the panel assembly contemplated herein includes a quick disassembly and reassembly feature not possible with such sandwich structures.

Although shown and described in what is believed to be the most practical and preferred embodiment, it is apparent that departures from the specific structures shown will suggest themselves to those skilled in the art and may be made without departing from the spirit and scope of the invention. I therefore do not wish to restrict myself to the particular forms of construction illustrated and described, but desire to avail myself of all modifications that may fall within the scope of the appended claims.

Having thus described my invention, what I claim is:

1. In a structural panel assembly, an integrally formed structural unit comprising a pair of spaced, substantially contiguously disposed walls each having inner and exterior surfaces and each being provided on one end thereof with hooked flanges, a web interconnecting said walls in the vicinity of the ends thereof remote from said hooked flanges, abutments integral with and extending from the ends of said web, each of said abutments having outer surfaces disposed substantially in the plane of the inner surface of that wall connected to the same end of said web, a groove provided in the outer surface of said abutments at their junction with said web, said groove being contoured corresponding to said hooked flanges to coact with and immovably secure a similarly hooked flange carried by an associated structural unit, a rib extending inwardly from one of said walls at the juncture thereof with said web, a second rib extending inwardly from the other of said walls at the juncture thereof with said web and being substantially parallel to said first-mentioned rib, one of said ribs being provided with a bead and the other of said ribs being provided with a groove matingly complemental to said bead to coact with and immovably secure a similarly formed bead provided on a rib of said associated structural unit.

2. The structural unit of claim 1 wherein said web is disposed at a selected angle relative to said walls.

3. The structural unit of claim 2 wherein the plane of each of said ribs and the plane of said web adjacent thereto are symmetrical about a plane normal to that of said walls.

References Cited by the Examiner

UNITED STATES PATENTS

| 3,172,508 | 3/1965 | Doering et al. | 52—579 |
| 3,191,724 | 6/1965 | De Ridder | 52—579 X |

FRANK L. ABBOTT, *Primary Examiner.*

RICHARD W. COOKE, Jr., *Examiner.*